C. W. OSTRANDER.
ADJUSTABLE CASTER.
APPLICATION FILED DEC. 10, 1920.
1,375,536. Patented Apr. 19, 1921.
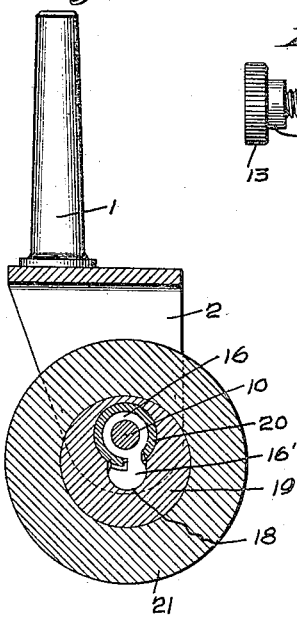
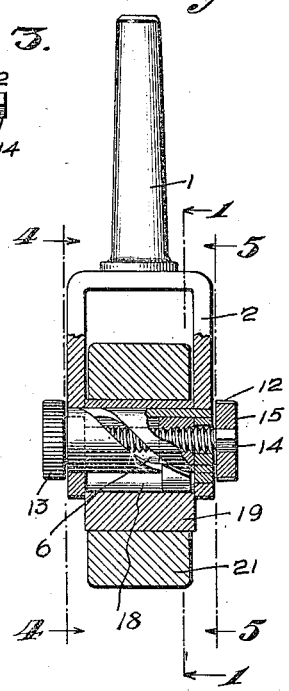
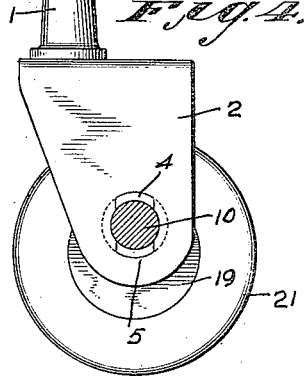
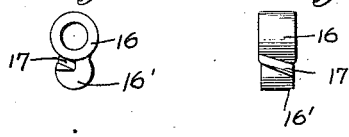
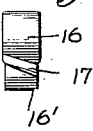
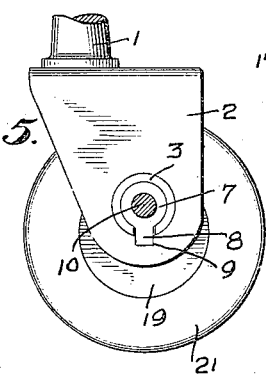
WITNESSES
H. C. Hebig
A. L. Kitchin
INVENTOR
CHARLES W. OSTRANDER
BY
ATTORNEYS

UNITED STATES PATENT OFFICE.

CHARLES W. OSTRANDER, OF WINSTED, CONNECTICUT.

ADJUSTABLE CASTER.

1,375,536.  Specification of Letters Patent.  Patented Apr. 19, 1921.

Application filed December 10, 1920. Serial No. 429,686.

*To all whom it may concern:*

Be it known that I, CHARLES W. OSTRANDER, a citizen of the United States, and a resident of Winsted, in the county of Litchfield and State of Connecticut, have invented a new and Improved Adjustable Caster, of which the following is a full, clear, and exact description.

This invention relates to casters and has for an object to provide an improved construction wherein the usual caster effect is secured while the wheel thereof may be raised and lowered and locked in any adjusted position.

Another object of the invention is to provide a vertically adjustable wheel for casters wherein means are provided which will permit the vertical adjustment of the wheel substantially, regardless of the weight thereon.

A still further object of the invention is to provide an adjusting and locking means for caster wheels that includes a threaded shaft having a traveling member threaded thereon and a cam co-acting with the traveling member for producing the desired adjustment as the traveling member is moved.

In the accompanying drawing—

Figure 1 is a sectional view through Fig. 2 on line 1—1.

Fig. 2 is a front view of a caster wheel with the lower part in section disclosing one embodiment of the invention.

Fig. 3 is a side view of the threaded member embodying certain features of the invention.

Fig. 4 is a sectional view through Fig. 2 on line 4—4.

Fig. 5 is a sectional view through Fig 2 on line 5—5.

Fig. 6 is a side view of a cam member embodying certain features of the invention.

Fig. 7 is an end view of a traveling member embodying certain features of the invention.

Fig. 8 is a side view of the structure shown in Fig. 7.

Referring to the accompanying drawing by numerals, 1 indicates the usual pin or pintle which acts as a journal member and which is secured in any desired manner to a yoke 2 formed substantially of the usual construction except that it has special openings on the lower ends as hereinafter described for receiving the combined cam and journal member 3. The member 3 is tubular and formed at one end with cut-away portions so as to present lugs 4 and 5 to fit into notches of proper shape formed in the yoke 2 while the opposite end of the cam member 3 fits into a round aperture in the opposite side of the yoke. Member 3 is provided with a spiral slot 6 extending from near lug 4 to the opposite end of the member and in said opposite end is fitted a washer 7 having a tongue or lug 8 projecting through the slot 6 and into a notch 9 in the yoke 2 whereby the end of the member 3 carrying the washer 7 cannot rotate while lugs 4 and 5 prevent the opposite end from rotating. A threaded member 10 is fitted into the cam member 3 and is formed with an enlarged smooth section 11 for maintaining the threaded section 12 centrally of member 3. Adjacent the section 11 is a roughened or knurled head 13 which may be manually actuated for rotating the entire member 10. Opposite the member 13 is a squared section 14 for receiving a thumb member 15 having a squared aperture. By this construction and arrangement the threaded member 10 may be rotated from either end. A traveling nut or traveling member 16 is threaded into the threaded section 12 of member 10 and is provided with a lug 16' having a groove 17 fitting against one of the walls of the slot 6. The outer end of the lug 16' fits into a longitudinally arranged recess 18 in the bearing 19 which bearing is provided with a bore 20 merging into groove 18. The cam member 3 is intended to fit loosely in the bore 20 of the bearing member 19.

When the parts are in the position shown in Figs. 1 and 2, the wheel 21 is in its lowest position. In case it should be desired to elevate this wheel and, consequently, lower the yoke 2 and anything supported thereby, thumb members 13 and 15 or either of them may be rotated so as to cause the traveling member 16 to move from the position shown in Fig 2 toward the left in said figure. As the cam member 3 is held stationary and the traveling member 16 is forced along by the threaded section 12, the bearing member 19 will be rotated slowly. This rotation may continue, if desired, until the bearing member 19 has traveled a half revolution whereupon the yoke 2 will be in its lowermost position. This construction will not only permit the vertical adjustment of the caster wheel 21 in respect to the yoke 2 but will positively lock the bearing member 19 in any position in which it is left as a turning motion exerted thereon by the wheel 21 will not cause a rotation of the threaded member 10 and unless this member is rotating member 19 cannot be rotated.

What I claim is:—

1. A caster comprising a casing provided with means for connection with a suitable socket on a wheel, means for adjustably mounting said wheel in said casing so as to vary the effective height of the caster and means acting in the double capacity of mechanism for shifting the position of the wheel and locking the same in an adjusted position.

2. A caster of the character described comprising a casing having a pair of sides, a wheel arranged in said sides and an eccentrically mounted bearing member for each wheel arranged between said sides, a cam member rigidly connected with said sides and extending through the bearing member and means co-acting with the cam member and the bearing member for shifting the bearing member so as to vary the effective height of the caster.

3. A caster of the character described comprising a yoke having a pair of sides provided with openings, a tubular cam member arranged in the yoke with the ends extending into said openings, said cam member being rigidly secured to said yoke, a bearing member eccentrically mounted on said cam member, a wheel rotatably mounted on said bearing member and manually actuated means co-acting with said bearing member and engaging the cam member for rotating said bearing member and locking the same in different positions.

4. A caster of the character described comprising a yoke, a caster wheel, a bearing extending through the caster wheel having an eccentrically positioned opening therein, a tubular cam member threading into said opening and secured to said yoke, a threaded member extending through said tubular cam member, a traveling member threaded onto said threaded member provided with a projection engaging said bearing member, said bearing member having a groove extending from one end to the other accommodating said projection and means forming part of the cam member acting on the projection when it is moved by the threaded member for causing the lug and the bearing member to rotate slowly for varying the effective height of the caster.

5. A caster of the character described comprising a yoke, a cam member rigidly secured to said yoke, said cam member being tubular and open at both ends, said cam member being also formed with a spiral groove extending from near one end to the opposite end, a threaded member extending through said cam member, a traveling nut threaded onto said threaded member and formed with an extension projecting through said spiral slot, a bearing member formed with an opening for accommodating said cam member and a groove for accommodating said lug and a wheel rotatably mounted on said bearing member.

6. A caster of the character described comprising a yoke having an opening on each leg thereof, one of said openings being circular and the other irregular in shape and a tubular cam member having an irregular end fitting into the irregular opening and the circular end fitting into the circular opening, said cam member having a spiral slot extending to the end fitting in said circular opening, a washer arranged in said cam member at the end fitting in the circular opening, said washer having a lug extending through part of said slot and into the notch adjacent said circular opening whereby the circular end of said cam member is locked against rotation, a bearing member rotatably and eccentrically mounted on said cam member, a wheel rotatably mounted on the bearing member and means including a thumb member and a lug extending through said slot for rotating said bearing member to vary the effective height of the caster.

7. A caster of the character described comprising a yoke having openings in each leg thereof, a tubular cam member rigidly secured in said openings, said tubular cam member having a spiral slot, a threaded member extending through said tubular cam member, said threaded member having a thumb member at one end and a squared section at the opposite end, a thumb member fitted on said squared section whereby the threaded member may be rotated from either end, a traveling member threaded onto said threaded member and provided with a lug extending from said slot whereby when the threaded member is rotated the lug will be moved longitudinally of the threaded member and also spirally by reason of the spiral slot, a bearing member rotatably and eccentrically mounted on said tubular cam member, said bearing member having a groove for receiving said lug whereby whenever said lug is moved it may slide longitudinally along said groove and at the same time rotate the bearing member as the lug operates the spiral in said cam member and a wheel rotatably mounted on said bearing member.

CHARLES W. OSTRANDER.